United States Patent
Seppala et al.

(10) Patent No.: US 11,493,756 B2
(45) Date of Patent: Nov. 8, 2022

(54) MITIGATION OF THE HARMFUL EFFECTS OF STRAY-LIGHT REFLECTIONS IN HIGH-ENERGY LASER SYSTEMS

(71) Applicant: Lawrence Livermore National Security, LLC, Livermore, CA (US)

(72) Inventors: Lynn G. Seppala, Livermore, CA (US); Alvin C. Erlandson, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 413 days.

(21) Appl. No.: 16/603,774

(22) PCT Filed: Apr. 19, 2018

(86) PCT No.: PCT/US2018/028445
§ 371 (c)(1),
(2) Date: Oct. 8, 2019

(87) PCT Pub. No.: WO2018/195362
PCT Pub. Date: Oct. 25, 2018

(65) Prior Publication Data
US 2021/0096360 A1    Apr. 1, 2021

Related U.S. Application Data

(60) Provisional application No. 62/487,780, filed on Apr. 20, 2017.

(51) Int. Cl.
*G02B 27/00* (2006.01)
*G02B 5/00* (2006.01)
(Continued)

(52) U.S. Cl.
CPC ......... *G02B 27/0018* (2013.01); *G02B 5/003* (2013.01); *G02B 19/0009* (2013.01); *G02B 19/0047* (2013.01); *G02B 27/30* (2013.01)

(58) Field of Classification Search
CPC .. G02B 27/003; G02B 27/0018; G02B 27/09; G02B 27/0944; G02B 27/0955;
(Continued)

(56) References Cited

U.S. PATENT DOCUMENTS 5,153,772 A * 10/1992 Kathman ................ G02B 5/32
359/741
6,462,889 B1    10/2002 Jackson
(Continued)

FOREIGN PATENT DOCUMENTS

JP    2006-162878    6/2006

OTHER PUBLICATIONS

International Search Report and Written Opinion for PCT/US2018/028445 corresponding to U.S. Appl. No. 16/603,374, 8 pages.
(Continued)

*Primary Examiner* — Sultan Chowdhury
(74) *Attorney, Agent, or Firm* — Knobbe, Martens, Olson & Bear, LLP

(57) ABSTRACT

Reduction or elimination of negative consequences of reflected stray light from lens surfaces is achieved by propagating a laser beam through an eccentric pupil that excludes the optical axis of the system, which is rotationally symmetric. In such systems, stray light reflections eventually are focused onto the unique optical axis of the system, in either a real or virtual focal region. By using an eccentric pupil, all damage due to focusing of the stray light lies outside of the beam. These focal regions can, e.g., be physically blocked to eliminate beam paths that lead to optical damage, re-pulse beams and parasitic lasing.

36 Claims, 18 Drawing Sheets

(51) Int. Cl.
 *G02B 19/00* (2006.01)
 *G02B 27/30* (2006.01)
(58) Field of Classification Search
 CPC ............ G02B 27/0966; G02B 27/0988; G02B 27/30; G02B 5/003; G02B 5/005; G02B 5/006; G02B 5/0252; G02B 5/0278; H01S 3/005; H01S 3/0064; H01S 3/09415; H01S 3/10023; H01S 3/2316
 See application file for complete search history.

(56) References Cited

U.S. PATENT DOCUMENTS

| | | |
|---|---|---|
| 7,055,959 B2 | 6/2006 | Wada et al. |
| 7,390,101 B2 | 6/2008 | Lundgren |
| 9,030,657 B2 | 5/2015 | Kuhn et al. |
| 9,616,679 B2 | 4/2017 | Childers |
| 2012/0026592 A1* | 2/2012 | Reininger ............... G02B 13/06 359/619 |
| 2013/0182224 A1* | 7/2013 | Schwiegerling ......... G02B 5/32 351/234 |
| 2015/0001408 A1* | 1/2015 | Frank ................. G02B 27/0905 250/504 R |
| 2018/0348620 A1* | 12/2018 | Miller ................... G02B 5/003 |

OTHER PUBLICATIONS

Reyes et al., "Irradiation Effects on RIA Fragmentation Cu Beam Dump," pp. 3265-3267, 2005.
Murray et al., "Parasitic Pencil Beams Caused by Lens Reflections in Laser Amplifier Chains," Jul. 7, 1995.

\* cited by examiner

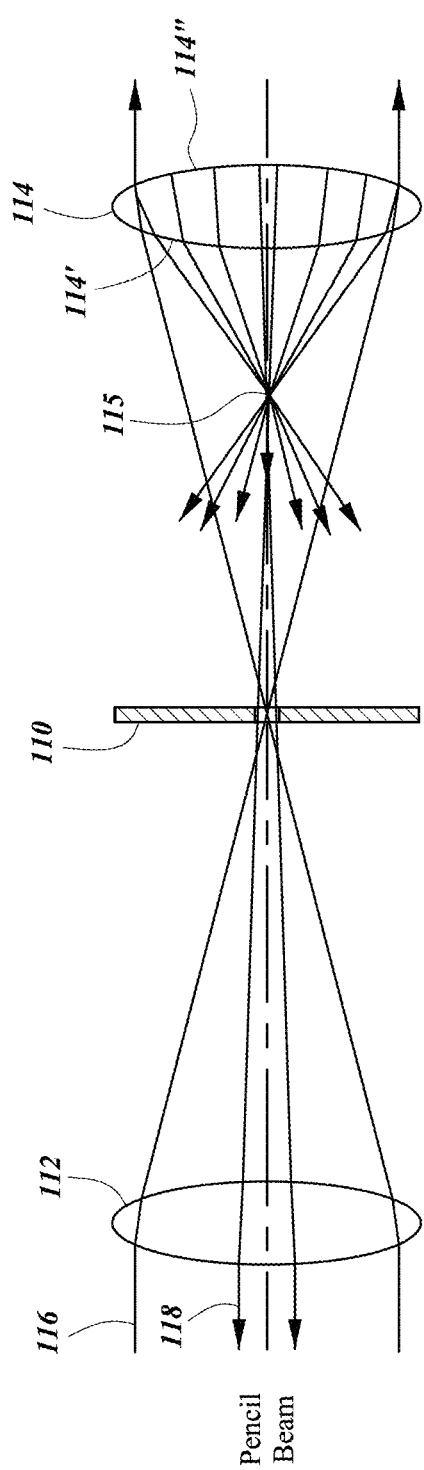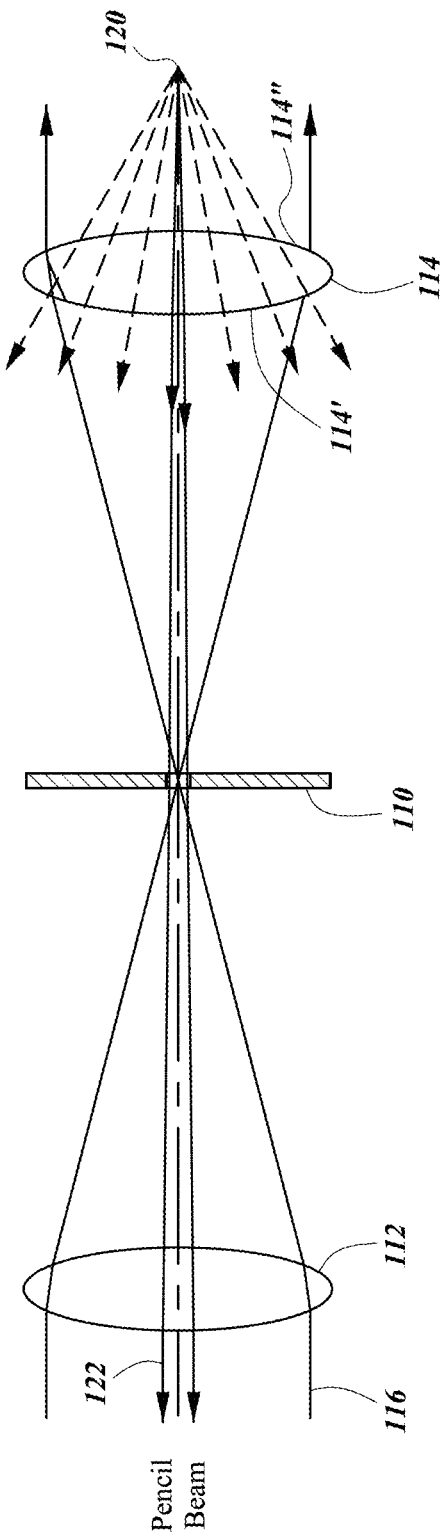

MITIGATION OF THE HARMFUL EFFECTS OF STRAY-LIGHT REFLECTIONS IN HIGH-ENERGY LASER SYSTEMS

CROSS-REFERENCE TO RELATED APPLICATIONS

This application claims the benefit of U.S. Provisional Patent Application No. 62/487,780 titled "Mitigation of The Harmful Effects of Stray-Light Reflections in High-Energy Laser Systems," filed Apr. 20, 2017, incorporated herein by reference.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND

Field

The present technology relates to high energy/high power laser systems, and more specifically, it relates to techniques for mitigating the harmful effects of stray-light reflections in such systems.

Description of Related Art

Lenses are used in high energy/high power laser systems for several purposes, some example of which are described below.

1) Image relaying—Most high-energy or high-average-power lasers use telescopes to reimage an input aperture, repeatedly, at multiple locations throughout the laser beamline. Such telescopes usually comprise a pair of positive convex lenses. See FIG. 1, which shows and optical axis 10 upon which are two convex lenses (12, 14) and a spatial filter 16. The figure illustrates a laser beam 18 traveling from image plane 1 that is focused by lens 12. After the beam passes through spatial filter pinhole 16 it is recollimated by lens 14. The beam is recollimated since the two lenses are confocal. Together, the two lenses transfer or relay the image of the beam from image plane 1 to image plane 2. The purpose of image relaying is to reproduce at each image plane the intensity and phase distributions that exist at the previous image plane, going back to the original input plane. Image relaying reduces the undesirable effects of beam diffraction. Beam diffraction degrades beam quality and beam fill factor as the beam propagates, especially when beams have high fill factor (e.g., beam with super-Gaussian intensity distributions) to make optimum use of expensive laser optics. Image relaying resets the effective propagation distance for diffractive effects to the distance from the nearest image relay plane, rather than the distance from the initial input plane.

The telescope in FIG. 1. is known as a Keplerian telescope. Most high pulse energy and high average power lasers use a series of Keplerian telescopes, such as the one shown, to re-image the input plane of the system repeatedly at various image planes distributed through the beamline. Although symmetrical biconvex lenses are used in the illustration, asymmetrical biconvex, plano-convex and meniscus lenses can also be used.

2) Spatial filtering—Often, image relaying telescopes have a small aperture or "pinhole" at the focus to filter out high spatial-frequency components. This filtering improves beam quality by removing small-scale, high-spatial-frequency components of the beam intensity and phase distributions, in effect smoothing the beam. See FIG. 2, which shows a laser beam 20 propagating through an amplifier stage 22, passing through an input lens 26 and coming to a focus. Spatial filtering is achieved by placing a small-diameter aperture, also called a pinhole 28, at the focal spot formed by lens 26. Since the electric field distribution in the focal plane is a Fourier transform of the collimated beam, with the highest spatial-frequency components farthest away from the optical axis, the pinhole removes high spatial-frequency components while allowing low spatial-frequency components to pass. After passing through the pinhole, the beam is recollimated by lens 30. The recollimated beam then passes through a second amplifier stage 32. In this example, the Keplerian telescope formed by lenses 26 and 30 relays the image of the beam from image plane 24 to image plane 34.

3) Beam magnification or de-magnification—Telescopes are also used to magnify or de-magnify the beam as it propagates through the beamline. Magnification or demagnification occurs when the two confocal lenses used to form the Keplerian telescope have different focal lengths, as illustrated in FIG. 2. In this example, the focal length of lens 30 is longer than the focal length of lens 26. Since each lens in a Keplerian telescope is located a distance equal to its focal length from the common focus in the telescope, output lens 30 is farther from the common focus than is input lens 26. As a result, the transverse dimensions of the beam are magnified as the beam propagates from left to right in the figure. Typically, beam magnification is used to propagate the beam between amplifier stages of different aperture sizes. Generally, it is good practice to increase laser beam size as the beam becomes more energetic, to keep beam fluences below damage thresholds for optics.

4) Beam focusing—Many applications require high intensity, which can be achieved, as shown in FIG. 3, where lens 40 brings beam 42 to a focus onto target plane 44. Lenses are often used to achieve high intensity by focusing laser beams onto targets.

Lenses can produce problematic stray light reflections. Lenses, windows and other optics that transmit the laser beam usually have anti-reflective (AR) coatings applied to their surfaces to prevent stray light reflections. As these AR coatings are never perfect, each surface of a transmitting optic generates stray light reflections. Stray light reflections from lenses in particular can cause numerous problems in high energy or high average power laser systems, as discussed below.

FIG. 4 shows a collimated laser beam 50 traveling from left to right that is incident on a biconvex lens 52. Such a biconvex lens could be used in a telescope as discussed above or to focus the laser beam onto a target. Both the input surface S1 and the output surface S2 produce reflections. Multiple reflections from the two surfaces occur. Stray light generated by direct reflection from surface S1 forms a diverging beam, which is not shown in the figure. Stray light generated by reflection from surface S2 and by multiple surface reflections form converging beams that come to a focus. FIG. 4 shows examples of lowest-order stray-light reflections and their foci, often called "ghost foci." Higher-order reflections, although having lower energy, can also be of concern. In FIG. 4, the first, second and third-order ghost foci at points 54, 56 and 58, are produce by reflections from lens surfaces $S_2$, by lens surfaces $S_2$ and $S_1$ and by lens surfaces $S_2$, $S_1$ and $S_2$, respectively. Although a symmetrical biconvex lens is used in this figure, ghost foci are also produced by asymmetrical biconvex lenses and by planar-convex lenses.

Stray reflected light produced by lenses can cause a number of problems. For example, reflected light can attain sufficient fluence and intensity near ghost foci to damage nearby components. Additionally, ghost foci can produce optical breakdown in the air (or other gas) through which the beam propagates. The resulting disturbances to the phase and intensity of the main laser beam can cause intensity "hot spots" to develop in the laser beam, increasing the risk of optical damage to downstream optics. Stray light reflections from lenses can also produce parasitic "pencil beams" that propagate through spatial filter pinholes and can attain dangerously high fluence, particularly if the pencil beams are amplified.

Ghost foci can also form and cause damage inside the lenses themselves. See FIG. 5, which shows a parallel beam 60 that is reflected multiple times inside lens 62. After undergoing a number of reflections, the angle of incidence between the reflected beam and the lens surfaces exceeds the critical angle for total internal reflection, after which there is no further loss due to transmission through the lens surfaces. This feature allows foci produced within lenses to have surprisingly high intensities and to cause damage. See e.g., focus 63.

Lens reflections that make their way back to the laser front end are particularly troublesome as telescopes that magnify the beam in forward propagation will de-magnify it in backward propagation. Damage risk to front-end optics can be particularly high since the beam intensity and fluence are increased as the beam is de-magnified as it propagates backwards through the beamline. Another problem arises in multi-passed systems, in which the beam is propagated through the amplifiers several times to increase gain. Light reflected from lenses on the early passes can propagate in the forward direction and arrive at the target before the main pulse. Such pre-pulses often produce plasma at the target, which tends to expand and to interfere with the main pulse when it arrives. Additionally, stray light reflections can cause optical damage to the lenses themselves. After a few reflections, reflected light can become trapped inside the lens by total internal reflection. After several more reflections, the reflected light forms a caustic, which might have sufficient intensity and fluence to damage the lens.

The problems caused by stray reflected light become worse when AR coatings on the lenses degrade. Adsorption of contaminants, such as water vapor or organics, and repeated exposure to laser pulses, can degrade AR coatings. Laser pulses have been observed to densify and/or to metallize dielectric coatings, particularly for visible and UV wavelengths.

Laser-induced degradation can be especially significant in repetitively-pulsed, high-average power lasers, for which a large number of shots can be accumulated in a relatively short period of time. Stray reflected light produced in repetitively-pulsed, high-average power lasers can have additional effects that are not observed in low-repetition-rate or single-shot lasers. Specifically, even relatively weak absorption of stray light can cause undesirable heating of optics and mounts. When optics are heated, the resulting thermal gradients can cause wavefront distortion and birefringence. When mounts are heated, the resulting thermal expansion can misalign optical components.

Ghost foci can be eliminated by replacing lenses with concave mirrors. However, this solution creates its own problems. For example, incident and reflected beam paths for mirrors overlap, which can be problematic when components need to be used in one beam path but not in the other. A solution is to use mirrors at non-zero angles of incidence and to make incoming and outgoing beam paths sufficiently long to accommodate components. FIG. 6 shows a parallel beam 70 passing through a component 72 and then being reflected by concave mirrors 74 and 75. Unfortunately, significant wavefront aberration can be produced when concave mirrors having spherical shapes are used at non-zero angle of incidence. These aberrations can be eliminated by using parabolic rather than spherical shapes, but parabolic shapes are more expensive to fabricate. Another part of this solution, increasing beam path lengths, also increases beam footprint. Increased footprints tend to cause undesirable increases in building size or cost or, in some situations, make the laser design unusable. Concave mirrors can be used in place of lenses in many optical systems. However, such concave mirrors often need to be used at sufficiently large angles of incidence and at a sufficiently large distance from other components that components placed in the incident beam do not interfere with the reflected beam and vice versa.

In systems using lenses, optical damage due to ghost foci can be prevented by using "keep-out" zones to ensure that component locations do not overlap with ghost foci. An undesirable consequence of using keep-out zones is increased laser-system footprint. Additionally, the use of keep-out zones does not solve the problems of reflected beams travelling back to the laser front end or causing pre-pulsing at the target.

A partial solution to the ghost-foci problem is to shape the lenses with different "bending" or "shape factors," to shift the locations of the foci or to even eliminate one of the ghost foci. For example, the Nova laser at Lawrence Livermore National Laboratory (LLNL) used input lenses for the spatial filter telescopes where such lenses had a second-surface radius of curvature that was nominally coincident with the focus. Light reflected from the second surface was collimated. Therefore, a small tilt of this lens was sufficient to ensure that stray light was blocked by a pinhole downstream in another spatial filter.

In some situations, by tilting the lenses, stray reflected light from an odd number of lens surface reflections can be prevented from reaching the laser front end or from reaching the target ahead of the main pulse. This method was also used on Nova to eliminate some of the pencil beams that produce an optical pre-pulse. See FIG. 7, which shows a spatial filter 80 between two tilted lenses 82, 84. However, any light undergoing an even number of lens reflections (e.g., $S_2S_1$) is nominally unaffected by a lens tilt. With tilting, reflected light reaching the spatial filter plane is offset from the optical axis such that at least some of it is blocked by the spatial filter. Often, baffles are installed around the spatial filter assembly to prevent light from leaking around the spatial filter. Tilting the lenses produces undesirable coma and other wavefront aberrations, however. The magnitude of the tilt needed to eliminate the stray light and the attendant aberrations become smaller as the focal length of the lenses increases, but increasing the focal length increases the space required to house the laser system. FIG. 7 illustrates that by tilting the lenses, it is often possible to block stray reflected light from an odd number of reflections that would otherwise be passed through the spatial filter.

The fluence and intensity of ghost foci can be reduced by increasing the lens focal lengths. Telescope lengths and distances between relay planes increase in proportion to focal length, so this solution also has the undesirable consequence of increasing laser footprint.

A solution to the problem of internal ghost foci and caustics was found for the final focusing lenses of the Nova laser at LLNL. The solution was to use an annual groove on the first surface of the lens to block the potentially damaging rays. The solution was sufficiently successful that the lens was not damaged even when it was used without AR coatings.

Improved AR coatings is also a pathway to reduced stray reflected light from lenses and reduced damage risk from ghost foci. At LLNL, intensive research in sol-gel antireflective coating has been successful in reducing reflections to less than 0.1%, significantly improving from 0.25% to 0.5% of a standard hard multi-layer dielectric coating. Such sol-gel coatings tend to be physically delicate, which complicates cleaning and handling procedures. Additionally, sol-gel coatings tend to adsorb materials that degrade their antireflection characteristics.

FIG. 8 illustrates the use of a wedged focusing lens used on the National Ignition Facility (NIF) at LLNL to isolate and separate the $1\omega$, $2\omega$ and $3\omega$ focal regions so that only $3\omega$ light enters the target capsule. A $1\omega$ beam is directed through phase plate 90 and through vacuum window 92 and into the vacuum chamber. A portion of the frequency of the $1\omega$ beam is doubled with crystal 94 to produce $2\omega$ light, a portion of which is tripled with crystal 96 to produce $3\omega$ light; however, some $1\omega$ and $2\omega$ light continues to propagate along with the $3\omega$ after crystal 96. The wedged focusing lens 98 is located in the path of the light exiting crystal 96. Lens 98 is plano-convex, with a rotationally-symmetric second surface centered about the optical axis of the focused light. The first surface is configured to present a wedge to the incoming beam, resulting in a lens where the two surfaces have optical axes that are neither collinear nor parallel. The NIF wedged focus lens also has the desirable feature that the stray reflected light is focused well outside of the beam footprint. The figure shows the beam sampling grating 100, the main debris shield 102 and the disposable debris shield 104. Notice that only the $3\omega$ light is focused onto target 106. The beam sampling grating directs some of the $3\omega$ light to a diagnostic 108. Thus, FIG. 8 illustrates the NIF wedged focus lens (WFL) as it is used to separate $1\omega$, $2\omega$ and $3\omega$ light so that only $3\omega$ light enters the target capsule.

FIGS. 9A and 9B illustrate "pencil beams" generated by reflections from spatial filter lenses that can damage optics and produce pre-pulses on a target. Reflections from lens surfaces create parasitic beams that can damage optics in high-powered laser systems. These parasitic beams are low in energy initially, because of the low reflectivity of antireflection (AR) coated lens surfaces and because they are clipped by spatial filter pinholes, but subsequent amplification can raise them to damage fluence levels. Also, some of the pencil beams in multipass laser systems become prepulses at the output by by-passing one or more of the passes, arriving at the output ahead of the main pulse in time. They are insidious because pencil beams that are not initially a problem can become so due to a slow degradation of the AR coatings. Both figures depict the identical elements of a spatial filter 110 between lenses 112 and 114. Beam 116 is focused by lens 112 through spatial filter 110. The beam then expands and is collected by lens 114, the surfaces of which are designated in the figure as surface 114' and surface 114". FIG. 9A shows the situation where the beam 116 is reflected by the second surface 114" such that it focuses at point 115 between the lens 114 and spatial filter 110. A small part of the reflected beam will propagate back through the spatial filter and then through lens 112 to produce pencil beam 118. FIG. 9B shows the situation where the beam 116 is reflected by the surface 114' such that it appears to propagates from virtual point 120. A small part of the reflected beam will propagate back through the spatial filter and then through lens 112 to produce pencil beam 122.

FIG. 10 illustrates that ghost foci, which are also generated by reflections from lens surfaces, can produce high-intensity light that directly damages optical components. The figure shows an optical axis 130 with an optical component 132 and a lens 134. Light 136 traveling from left to right and parallel to the optical axis passes through the component 132 and then encounters surface 138 and then 140 of lens 134. Due to multiple reflections within the lens, some light with be directed to first-order ghost focus 142 and second-order ghost focus 144. In this case, a surface 146 of optical component 132 located at the position of the first-order focus 142 can be damaged if the fluence at the first-order focus exceeds the damage threshold of the component.

SUMMARY

In a refractive optical system, light passes sequentially through a series of lenses, from a source to an intended region beyond the lenses. Light that does not pass through the system, due to reflections from optical surfaces, is often referred to as reflected stray light. This stray light is unavoidable because even the best anti-reflective coatings have non-zero reflectance and surface reflections cannot be driven to zero, except in special circumstances. Stray light can be a serious problem in high power systems, causing, e.g., optical damage of optical components where stray light comes to a focus, in upstream and downstream optics, or in caustics inside lenses. Stray light can generate a pre-pulse beam in multi-pass configurations, can cause air breakdown which interferes with beam uniformity, or can result in parasitic lasing which reduces optical throughput.

The present technology attempts to eliminate many of these problems by propagating the laser beam through an eccentric pupil that excludes the optical axis of the system, which is rotationally symmetric. Rotationally-symmetric systems are favored because they simplify construction, reduce costs and offer efficient use of space. In such systems, all stray light reflections eventually are focused onto the unique optical axis of the system, in either a real or virtual focal region. By using an eccentric pupil, all damage due to focusing of the stray light lies outside of the beam. These focal regions can be physically blocked to eliminate beam paths that lead to optical damage, pre-pulse beams and parasitic lasing.

An embodiment herein uses a Keplerian telescope configuration with rotationally-symmetric lenses and with an eccentric pupil offset from the optical axis. Stray light reflected by both surfaces of the lenses comes to focus on the optical axis, which lies outside the main beam path. Positioning ghost foci out of the main beam path protects optical components close to the telescope from the potentially damaging effects of high fluence at the ghost foci. Additionally, stray reflected light can be blocked or absorbed without interfering with the main beam.

This present technology is useful for high pulse energy and high average power laser systems. One major advantage is the reduction or elimination of negative consequences of reflected stray light from lens surfaces. These negative consequences can include, e.g., optical damage to optics that are in the vicinity of the lenses, optical damage to the lenses themselves, generation of plasma within the beam path, which can absorb and distort the main laser beam, generation of parasitic or extraneous laser beams (e.g., "pencil beams") that can damage optics, back-reflection of light into the laser front end, which can damage front-end optics, and, in multi-pass laser systems, generation of pre-pulses that arrive at the laser target in advance of the main pulse and which can cause non-optimum laser-target interactions. Another advantage of the invention is the ability to construct laser beamlines that are more compact relative to laser beamlines in which stray light reflections are dealt with in other ways.

High-energy and high-average-power lasers using this invention can be used for many applications, including e.g., government-funded research and development such as inertial confinement fusion, laboratory astrophysics, high-energy-density physics, generation of secondary sources such as electron beams, proton beams, x-rays and gamma rays, commercial and industrial applications such as laser peening, annealing, cutting, welding and additive manufacturing, and medical applications using laser-generated x-rays and medical isotopes.

BRIEF DESCRIPTION OF THE DRAWINGS

The accompanying drawings, which are incorporated into and form a part of the disclosure, illustrate embodiments of the invention and, together with the description, serve to explain the principles of the invention.

FIGS. 9A and 9B illustrate that "pencil beams" generated by reflections from spatial filter lenses can damage optics and produce pre-pulses on a target.

DETAILED DESCRIPTION

The present technology was created considering many of the problems described above and propagates the laser beam through an eccentric pupil that excludes the optical axis of the system, which is rotationally symmetric. Rotationally-symmetric systems are favored because they simplify construction, reduce costs and offer efficient use of space. In such systems, all stray light reflections eventually are focused onto the unique optical axis of the system, in either a real or virtual focal region. By using such an eccentric pupil, all ghost foci and their attendant high-risk damage zones lie outside of the beam. These focal regions can be physically blocked to eliminate beam paths that lead to optical damage, pre-pulse beams, back-pulses returning to the front end and parasitic lasing.

Figure 1:
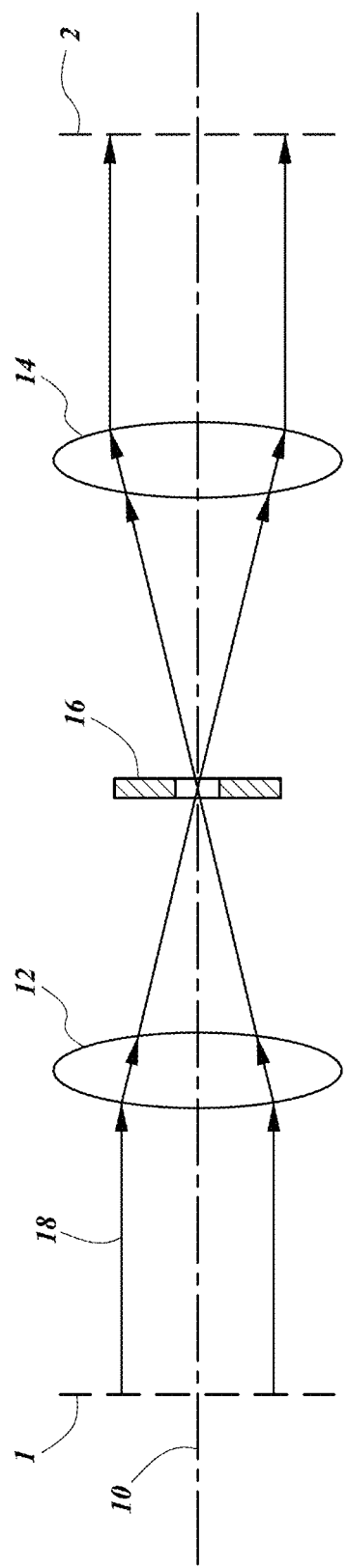
FIG. 1 shows a beam propagating through a Keplerian telescope.
Figure 2:
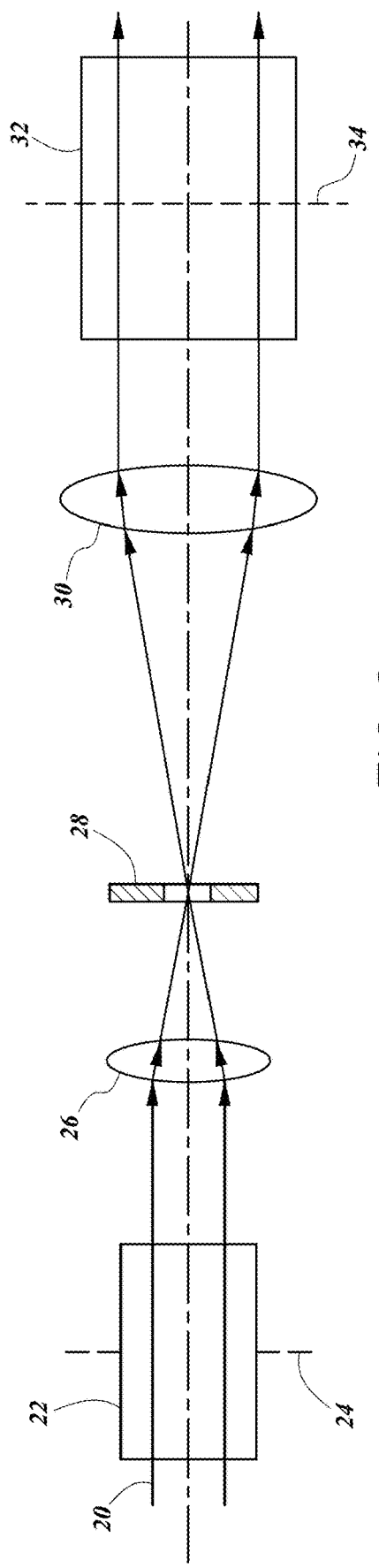
FIG. 2 shows a Keplerian telescope used to increase the beam diameter as the beam propagates from one amplifier stage to another.
Figure 3:
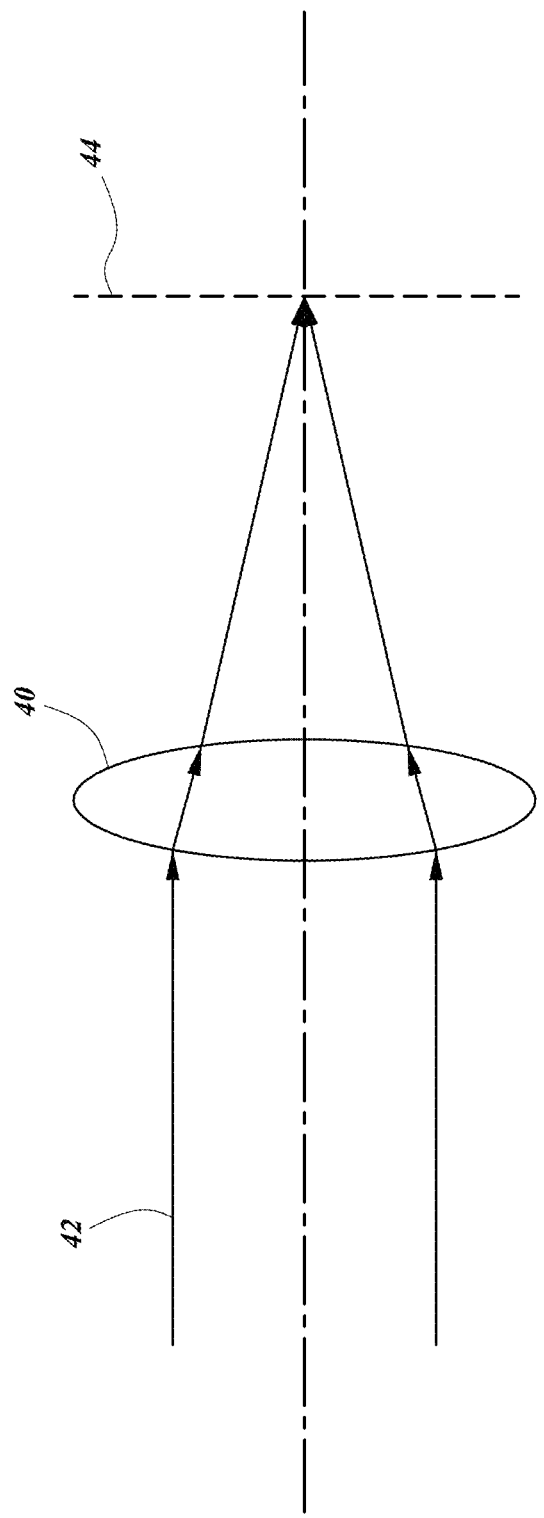
FIG. 3 illustrates how a lens brings a beam to a focus onto a target plane.
Figure 4:
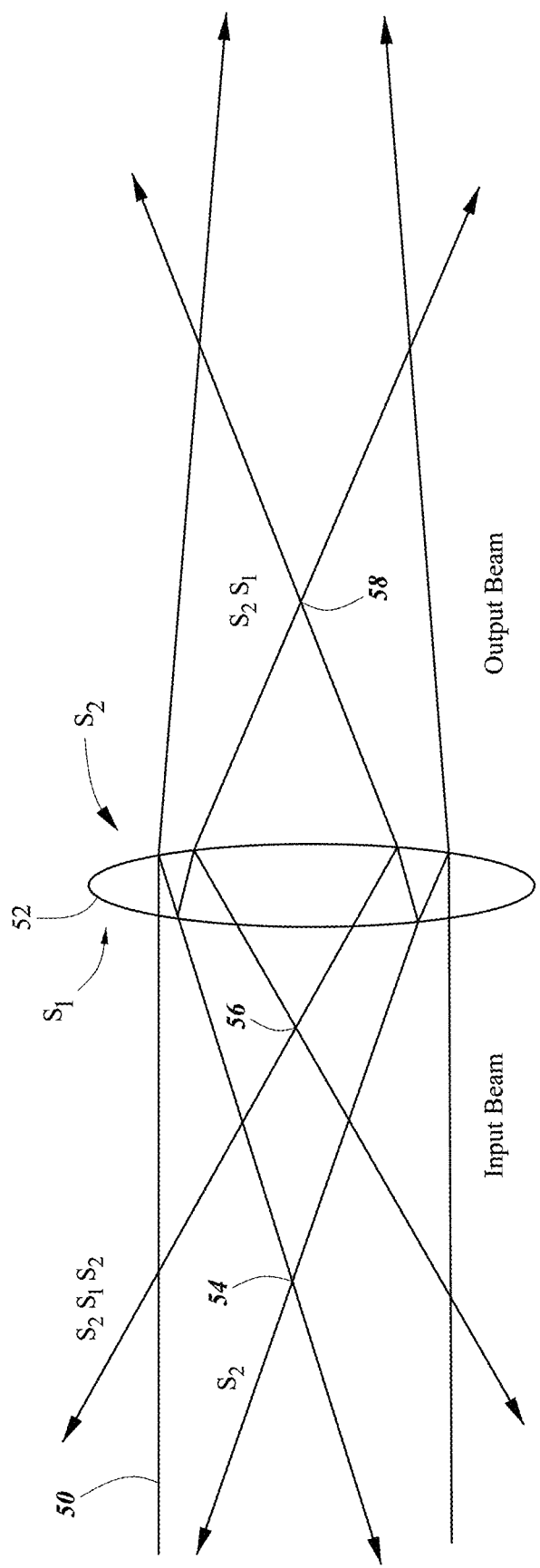
FIG. 4 shows examples of lowest-order stray-light reflections and their foci, often called "ghost foci."
Figure 5:
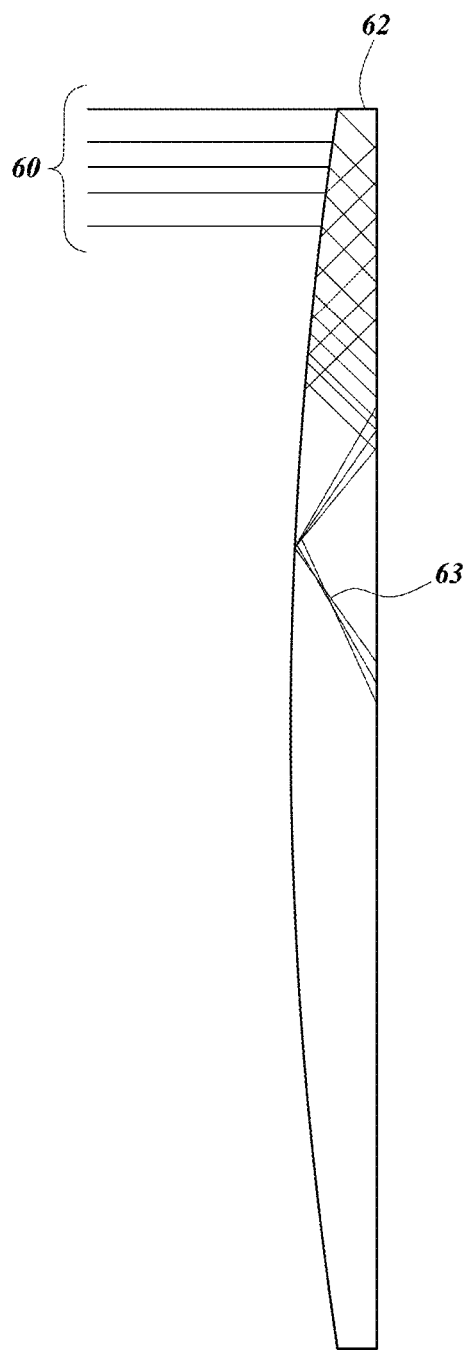
FIG. 5 shows a parallel beam that is multiply reflected inside a lens.
Figure 6:
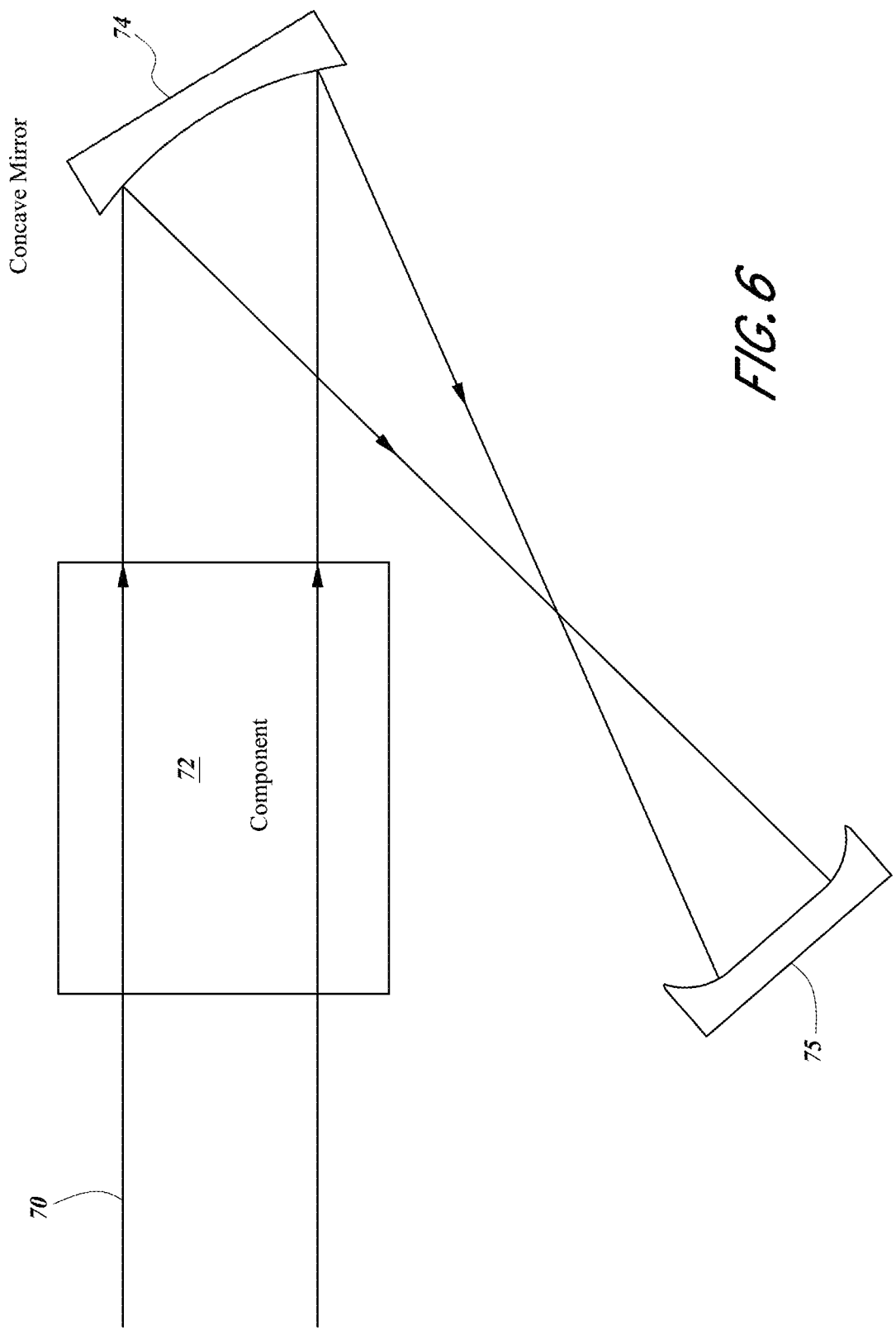
FIG. 6 shows a parallel beam passing through a component and then being reflected by a concave mirror.
Figure 7:
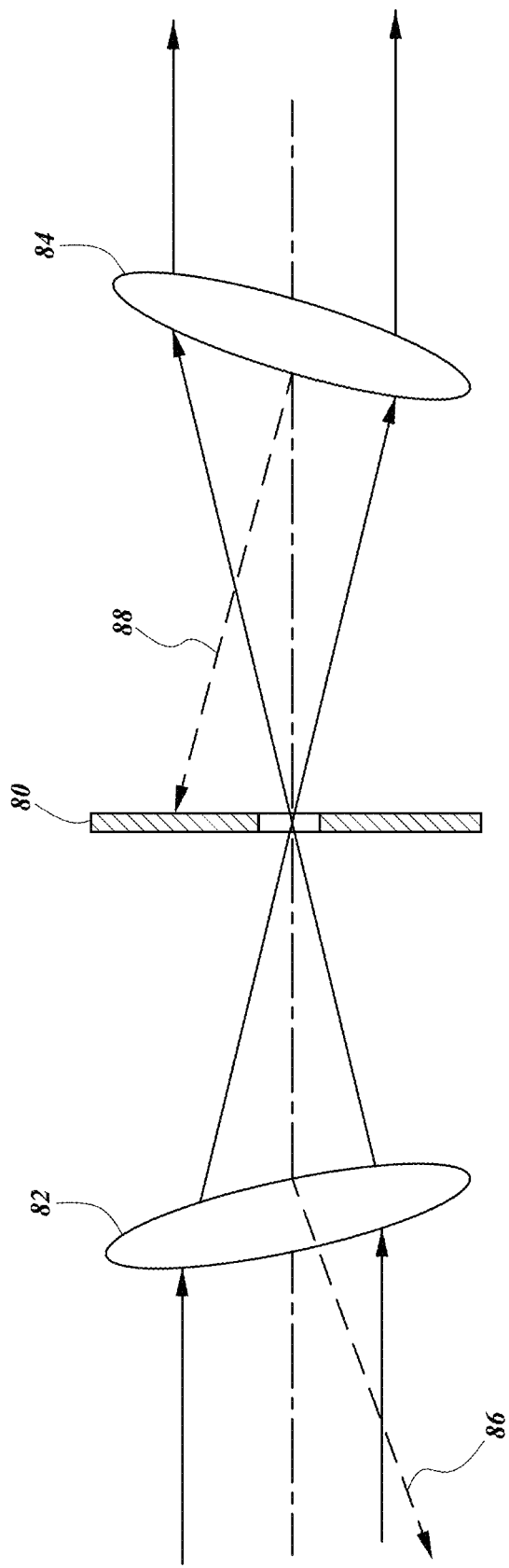
FIG. 7 illustrates that by tilting the lenses, it is often possible to block stray reflected light from an odd number of reflections that would otherwise be passed through the spatial filter.
Figure 8:
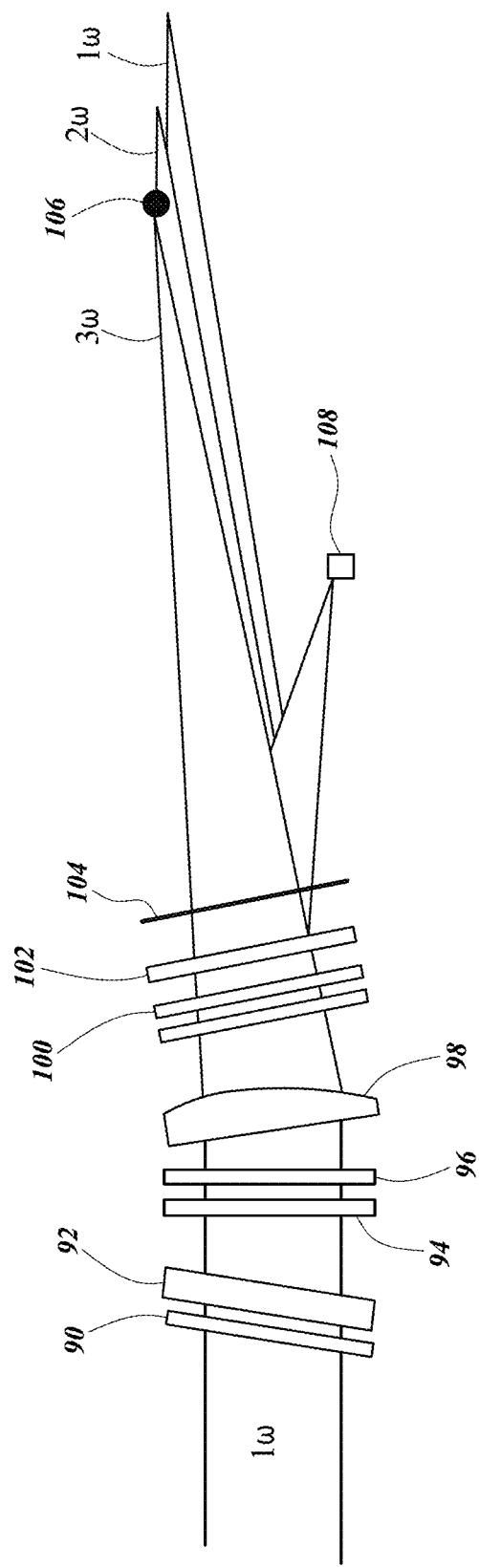
FIG. 8 illustrates the use of a wedged focusing lens used on the National Ignition Facility (NIF) at LLNL to isolate and separate the 1ω, 2ω and 3ω focal regions so that only 3ω light enters the target capsule.
Figure 10:
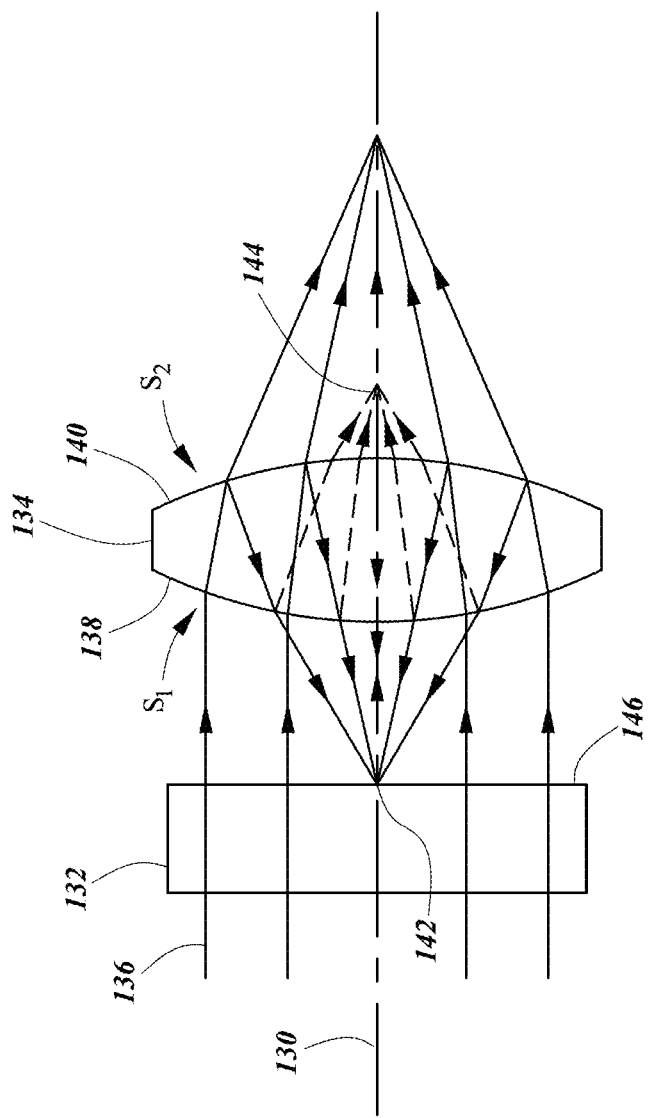
FIG. 10 illustrates locations of ghost foci, which are also generated by reflections from lens surfaces, and can produce high-intensity light that directly damages optical components.
Figure 11A:
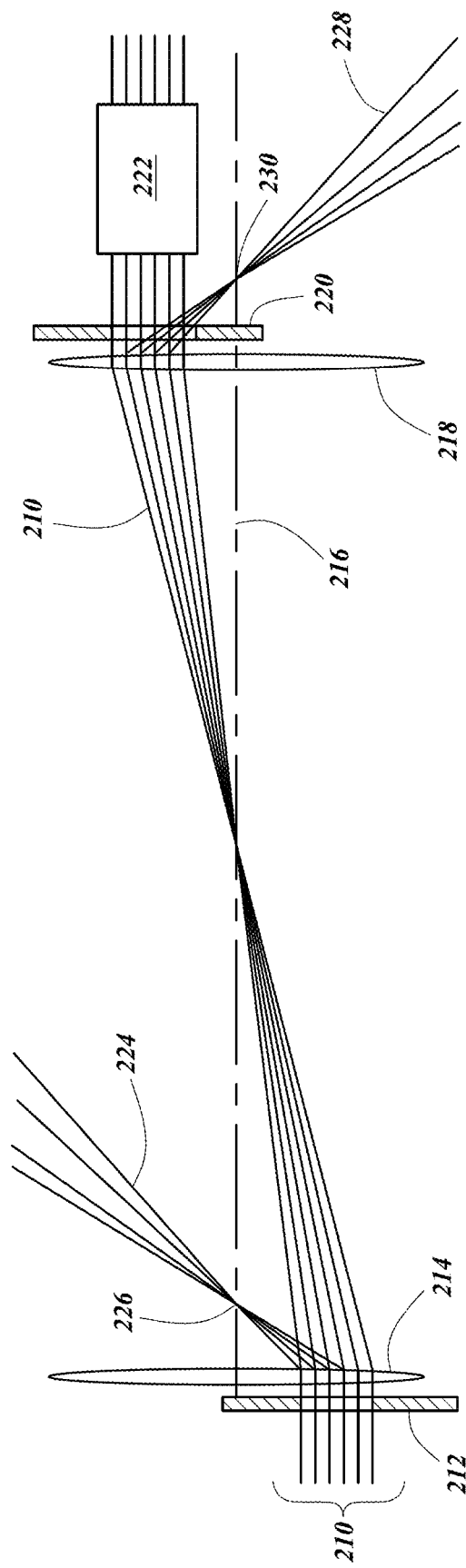
FIGS. 11A-11F illustrate embodiments of the present invention that use eccentric pupils to remove stray light from the main beam.

More specifically, FIG. 11A shows a main beam 210 propagating in series through a first eccentric or off-optical-axis pupil 212, through lens 214, across optical axis 216, through lens 218, through a second eccentric or off-optical-axis pupil 220 to continue through other optical components 222. The figure shows that lens 214 produces stray reflected light 224 which passes through a first ghost focus 226 at optical axis 216. The figure further shows that lens 218 produces stray light 228 which passes through a second ghost focus 230 on optical axis 216.

Figure 11B:
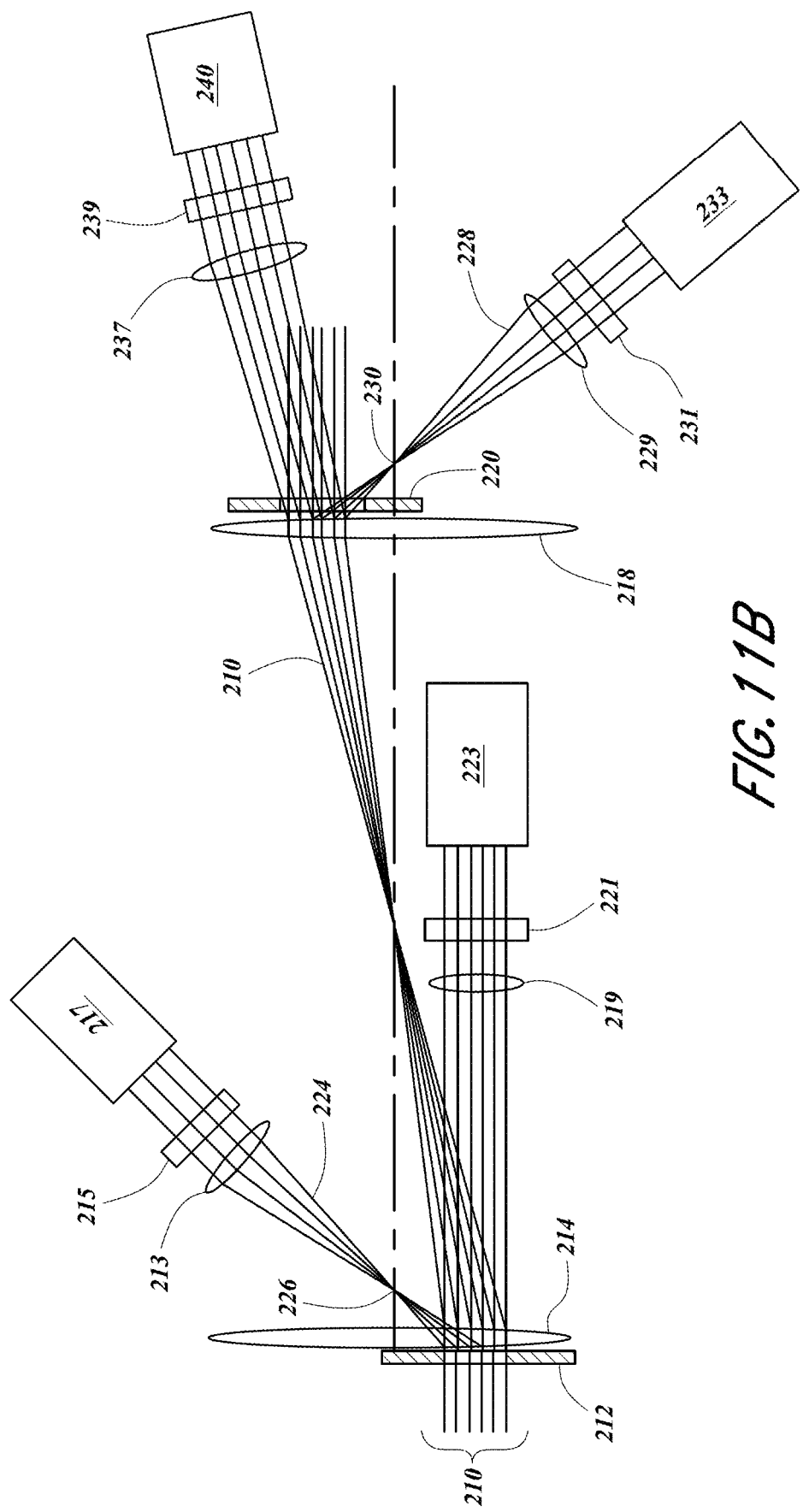

FIG. 11B illustrates a modification to the system of FIG. 11A so that it uses the ghost reflections off the lenses to either inject the laser beam from the front end of a laser or to sample the laser beam for diagnostic or alignment purposes. Using ghost reflections in this way is not feasible with centered pupils since the ghost reflections would overlap the main beam path and cause interference with the main beam. Specifically, either the front-end laser or the diagnostic package would block the main laser beam, or optics directing the beam from the front-end laser or to the diagnostic package would block the main laser beam. In the figure, a beam can be injected into the main beam path from any of front-end lasers 217, 223, 233 and/or 240. For example, a beam from laser 217 can be directed through static corrector plate 215 and then lens 213 through ghost foci 226 to enter the system through multiple reflections within lens 214 such that the beam is directed toward aperture 220. A beam from laser 223 can be directed through static corrector plate 221 and then lens 219 to lens 214. A beam from laser 240 can be directed through static corrector plate 239 and then lens 237 to lens 218. A beam from laser 233 can be directed through static corrector plate 231 and then lens 229 through ghost foci 230. In the case where the lasers 217, 223, 233 and/or 240 are included in the system, an alternate embodiment can omit beam 210 as well as aperture 212. Further, the second surface of lens 212 that is encountered by the beam counter-propagating on stray light path 224 may include a partially or fully reflective coating or other coating. Alternately, any of the front-end lasers can be replaced by diagnostic packages 217, 223, 233 and 240.

Four options for sampling the beam for diagnostics are illustrated in FIG. 11B.

1. A beam propagating from the focal plane of the telescope is reflected by the outer surface of lens 214 back toward the focal plane. This beam comes to a focus 226 of the stray light 224, is collimated by a lens 213, passes through a static corrector plate 215 and enters the diagnostic package 217.

2. A beam propagating from the focal plane of the telescope is reflected by the inner surface of one of lens 214 back toward the focal plane. This beam is collimated by lens 219, passes through a static corrector plate 221 and enters the diagnostic package 223.

3. A beam propagating from outside the telescope (parallel to the optical axis and from right to left in FIG. 11B) is reflected by the inner surface of lens 218 in a direction away from the focal plane. This beam comes to a focus 230, is collimated by lens 229, passes through a static corrector plate 231 and enters the diagnostic package 233.

4. A beam propagating from outside the telescope (parallel to the optical axis and from right to left in FIG. 11B) is reflected by the outer surface of one of the lenses in a direction away from the focal plane. This beam comes to the upper right in FIG. 11B) is collimated by a lens 237, passes through a static corrector plate 239 and enters the diagnostic package 240.

Static corrector plates are used to compensate for aberrations imposed on the sampled beam by its interactions with the eccentric-aperture lenses. Aberrations are caused by reflection and refraction of the beam at the curved surfaces of the eccentric-aperture lenses. It is standard practice today to use modern optics codes to model such aberrations, to determine the lens designs that minimize the aberrations, and to find shapes that can be applied to static corrector plates to reduce remaining aberrations, if needed. The arbitrary shape specified by the code would be achieved by using a deterministic finishing processes, such as magneto-rheological finishing (MRF).

A feature of options 1 and 3 discussed above is that the beam passes through the lens once, is reflected by a curved surface, then passes through the lens a second time. Due to the curvature of the reflective and refractive surfaces, the ghost reflection comes to a focus, typically at a distance from the lens that is short compared with the focal length of the lens (only ~23% of the focal length for a symmetric bi-convex lens). The beam is then recollimated using another lens, as shown in the diagram of FIG. 11B. In options 2 and 4 discussed above, the beam is reflected directly from the lens surface without propagating through the lens. Thus, aberrations due to refraction at the surfaces of the eccentric lens are eliminated. Additionally, aberrations due the curvature of the reflecting surface can be minimized by making the reflecting surface nominally flat, i.e., by making the eccentric lens a plano-convex lens. On this case, option 2 tends to produce smaller aberrations on the main beam than option 4 since the flat surfaces of the plano-convex lenses face the focal plane, consistent with best practice.

With some modifications, the options for sampling the beam described correspond to four options for injecting front-end laser beams into the main beam path. For each of the options 1 through 4, these modifications are: 1) to replace the diagnostic package with a laser front-end; and 2) to replace the sampled beam with an injected beam propagating in the opposite direction. The discussion above on the beam aberrations imparted on the sampled and main beams for the four options 1 through 4 also applies to four corresponding injected-beam cases. Therefore, just as for the sampling options, the beam-injection options 2 and 4 will tend to impart smaller aberrations on the injected beam than beam-injection options 1 and 3.

An alternative method currently used for sampling the beam is to place a beam splitter in the beam to divert a fraction of the beam energy to the diagnostic package. However, the method described here has the advantage of eliminating the need for inserting an extra component into the main beam path. Adding additional transmissive components tends to increase beam losses and to increase the non-linear phase shift (B-integral), which is usually undesirable.

Another alternative method currently used for sampling the beam is to design the reflective coating on a mirror at some location in the beam line to be partially transmitting, so that a portion of the beam energy is transmitted through the mirror to the diagnostic package. The method described here has the advantage of eliminating the need to produce a high-quality optical finish on the back, transmissive side of the partially-transmitting mirror, of eliminating the need to modify the back side of the mirror mount to allow the diagnostic beam to be propagated, and to make space in the vicinity of the back side of the mirror for the diagnostic package. The method described here gives the laser designer options to place the diagnostic package(s) at alternative locations, which, depending on the circumstances, may be useful or even necessary for fitting the overall laser system into the allocated space.

An alternative method currently used for injecting the beam is to place an injection mirror near the focal plane of a spatial-filter telescope, as is currently used on large fusion lasers such as the National Ignition Facility (NIF) in the United States and the Laser Mégajoule (LMJ) in France. A feature of method used by NIF and the LMJ is that the location of the focal spot must be moved transversely from pass to pass, so that the injection mirror does not block the main beam on any of its subsequent passes through the telescope. This angle offset at the focal plane also causes a transverse offset of the beam at the amplifier aperture, such that the amplifier aperture needs to be larger than the outer beam dimensions. As the angle offsets increase as more passes are accumulated, the number of passes taken is ultimately limited by the size of the amplifier aperture. The present technique has no such limitation, as the beam needs no angle offset to keep the main beam from hitting an injection mirror. The laser designer has the option of using no angle offset (in which case a Pockels-cell switch is recommended for holding off the gain, to prevent parasitic lasing), or a small angle offset (smaller than needed when using the injection mirror) to limit the number of passes taken by stray light and to reduce parasitic laser risk. The beam can be passed through the amplifier more times to make up for the increased loss of energy of the injected beam that results from the low reflectance of the lens. Note that since the ghost foci have been moved out of the beam due to eccentric-aperture lenses, the ghost foci are now more benign, and the reflectance of the reflecting lens surface might be increased to reduce the energy loss of the injected beam. The optimum reflectance will represent a tradeoff between injected-energy loss, losses experienced by the main beam each time it passes through the telescope, and the number of passes needed to produce the desired energy.

Figure 11C:
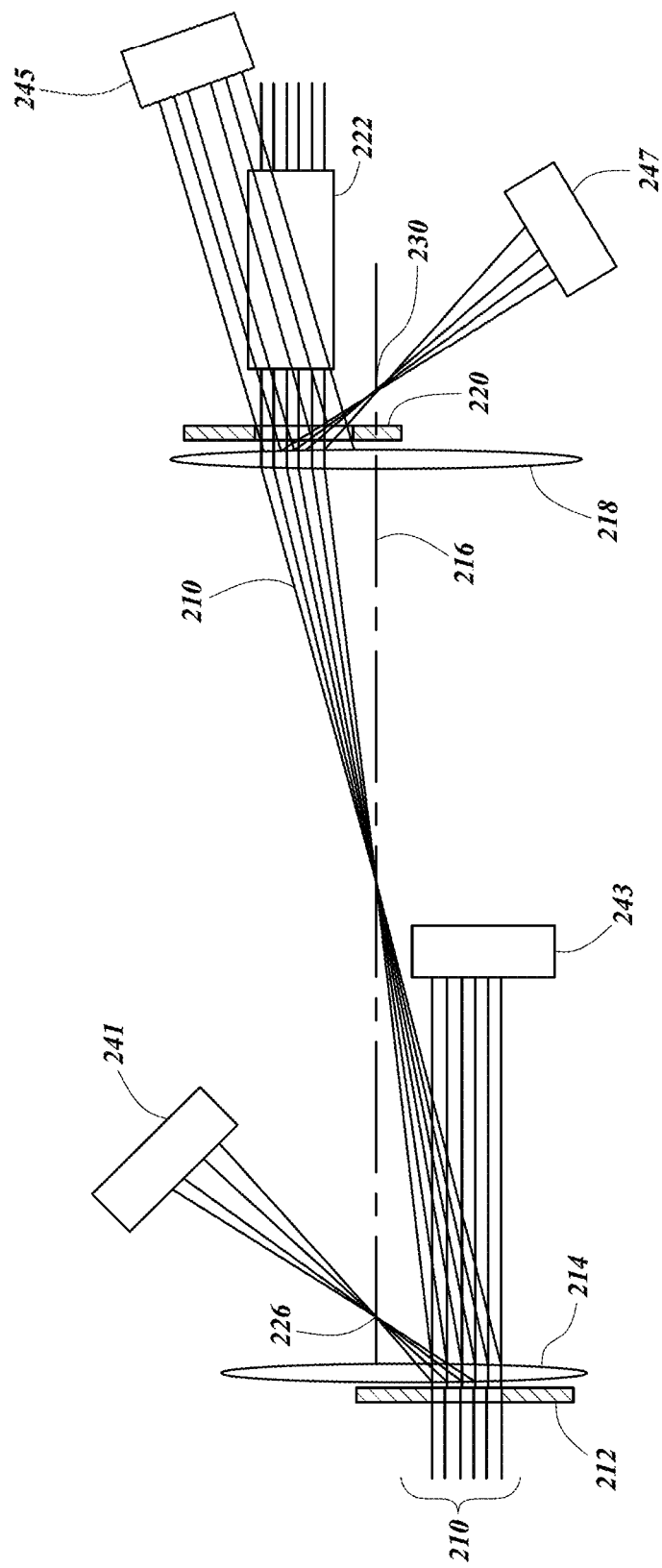
Figure 11D:
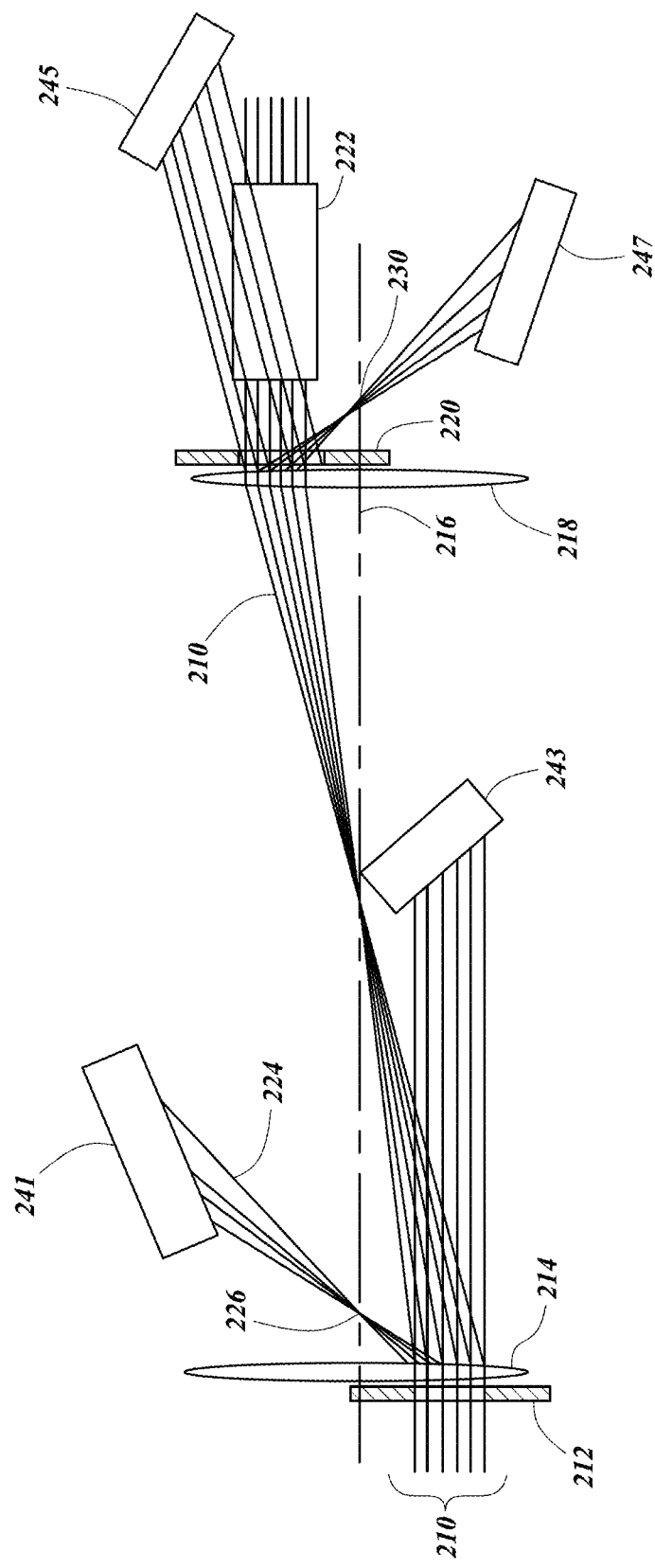
Figure 11E:
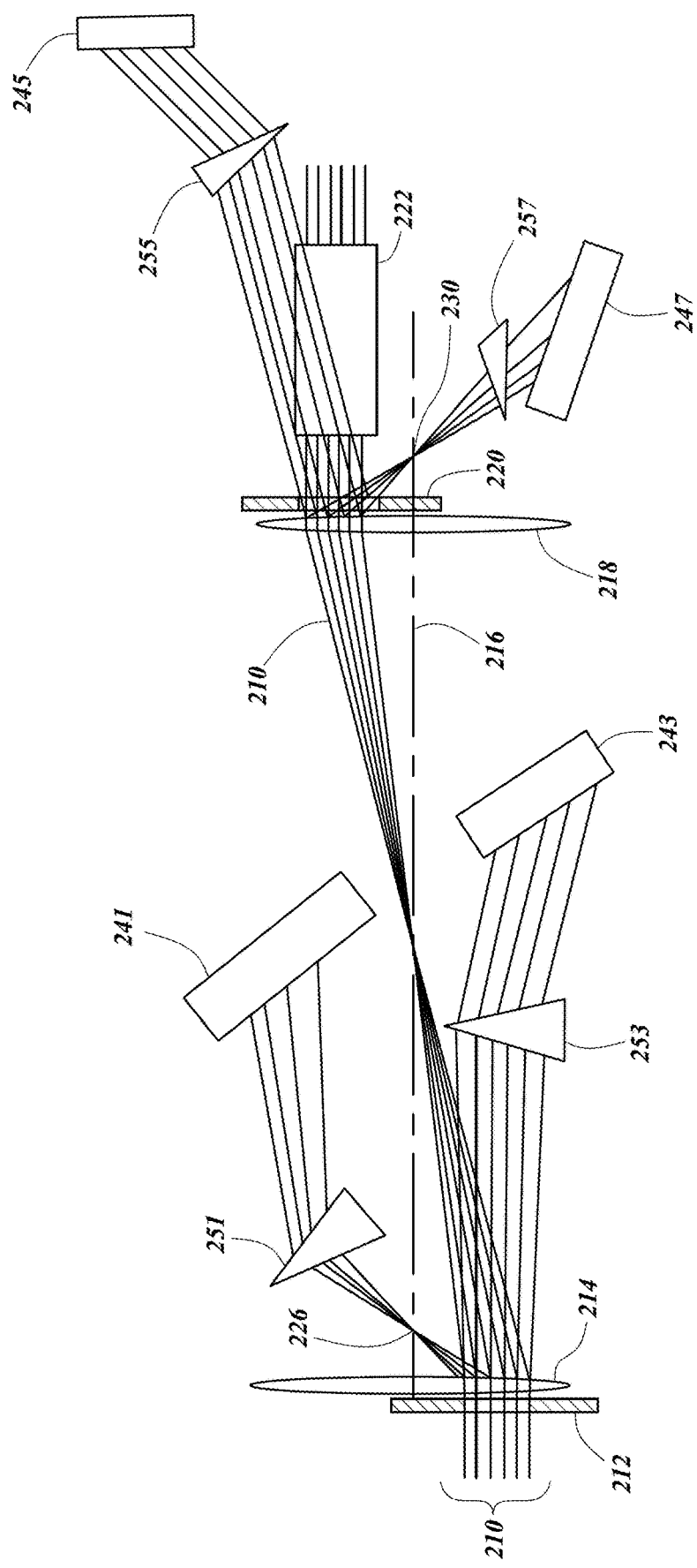

FIG. 11C illustrates use of absorbers 241, 243, 245 and/or 247 to terminate ghost reflections. Use of eccentric-pupil lenses puts the ghost reflections out of the main beam path so that absorbers can be used without interfering with the main beam. Absorbers might be actively cooled in the event that the laser is operated at high average power, either continuously or with repetitive pulsing. FIG. 11D illustrates tilting the absorbers of FIG. 11C to reduce fluences incident on the absorbers. FIG. 11E illustrates the use of the absorbers of FIG. 11C with the addition of prisms 251, 253, 255 and/or 257 to divert ghost foci at high fluence to more desirable absorber locations, or to change the fluence at the absorbers.

Figure 11F:
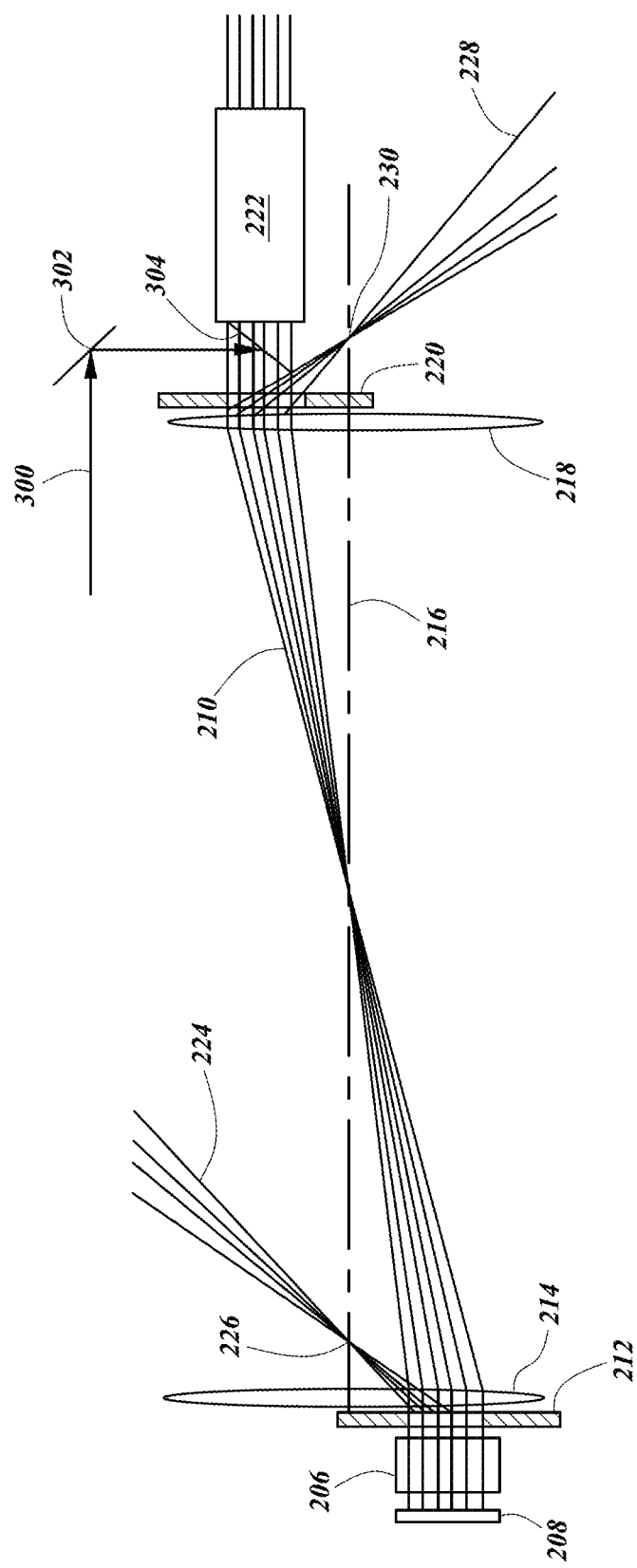

FIG. 11F shows the system of FIG. 11A modified to inject the pump beam 300 into the system. Pump beam 300 is reflected by a pair of mirrors (302, 304) through aperture 220 and lens 218 and then into the main beam line 210. The beam then passes through lens 214, aperture 212, amplifier 206 and is reflected by deformable mirror 208. The beam can make multiple passes through the system and can then be switched out to the optical components 222. Alternately, pump 300 may be injected into the system at other locations, e.g., as discussed above regarding the NIF.

Figure 12:
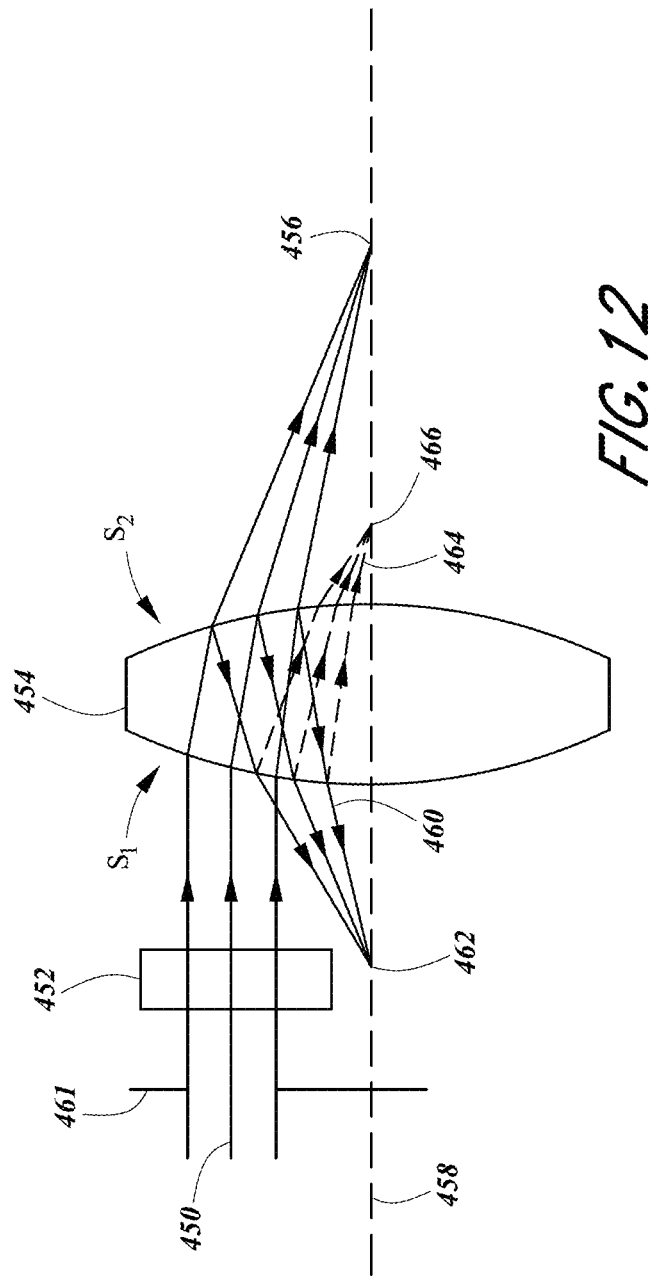
FIG. 12 shows an embodiment which eliminates ghost foci and pencil beam problems.

FIG. 12 illustrates an embodiment which eliminates ghost foci and pencil beam problems as a result of using the eccentric, or off-axis pupil. The figure shows beam 450 after it has passed through an off-axis pupil 461. The beam passes through optic(s) 452 and then propagates through lens 454 to be focused at focal spot 456 on optical axis 458. Stray light 460 is focused to the first-order ghost focus 462 on optical axis 458. Stray light 464 is focused to the second-order ghost focus 466 on optical axis 458. Notice that stray light 460 does not propagate onto or focus onto optic(s) 452. Notice also that neither stray light 460 nor stray light 464 continues to propagate within beam 450. Optic 452 can be replaced with a laser diode array. Thus, a use of the invention is in the design of telescopes for transporting diode light from diode arrays to laser slabs or other possible targets for the diode light. Use of eccentric-pupil optics would serve to protect the diode arrays from back-reflected light. Diode arrays can be highly sensitive to back reflections and are often damaged by back-reflected light.

Figure 13:
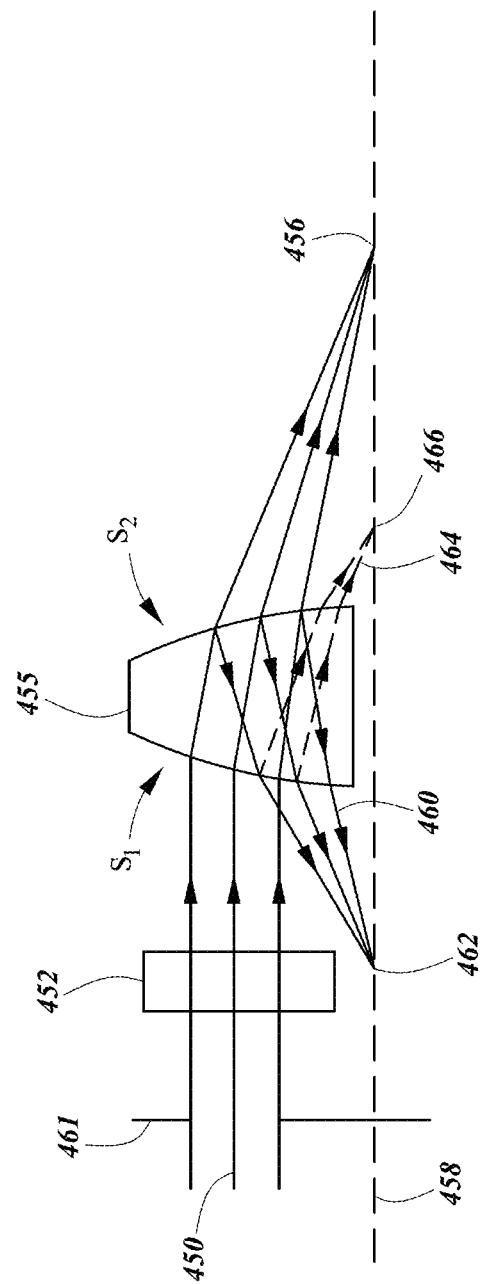
FIG. 13 shows an embodiment similar to the embodiment of FIG. 12, except that is utilizes a partial lens to eliminate ghost foci and pencil beam problems.

FIG. 13 shows an embodiment where only the portion of the lens that passes the beam need be used. The elements and description of FIG. 13 are identical to that of FIG. 12 except that full lens 454 of FIG. 13 is replaced in this figure with a partial lens 455. Thus, the figure shows beam 450 after it has passed through an off-axis pupil 461. The beam passes through optic(s) or element 452 and then propagates through partial lens 455 to be focused at focal spot 456 on optical axis 458. Stray light 460 is focused to the first-order ghost focus 462 on optical axis 458. Stray light 464 is focused to the second-order ghost focus 466 on optical axis 458. Notice that stray light 460 does not propagate onto optic(s) or element 452. Notice also that neither stray light 460 nor stray light 464 continues to propagate within beam 450.

When this technology utilizes lenses that are thicker on one side than the other (e.g., a plano-convex lens), a consequence will be that the nonlinear phase shift accumulated by intense laser beams will be greater on the thick side of the lens than on the thin side. Nonlinear phase shift leads to several undesirable beam characteristics, including growth of small-scale intensity features as the beam propagates. To limit this growth, it will be desirable to minimize the maximum nonlinear phase shift that is accumulated by the beam. The nonlinear phase shift can be minimized by alternating the side of the beam on which the lenses are thickest.

Similarly, in short-pulse cavities, relay telescopes using pairs of wedged lenses could be used to compensate for material dispersion, thereby eliminating the need for prism pairs.

A use of the present technology is to generate reflected light that can be used to diagnose the laser beam. Reflected light from lenses can be directed to detectors to determine the pulse shape, energy, wavefront or fluence distribution of the beam.

A use of the present technology is to couple light into a beam path from a laser front end. Just as light can be coupled out of a beam path and delivered to equipment to diagnose the beam, the process can be reversed to inject a beam into a beam path. In multi-pass system, light will tend to be reflected back to the front end. In such systems, back-pulse protection will need to be provided.

In some embodiments, beams are injected in the far field, near the focal plane of a spatial filter telescope. In these cases, angle multiplexing is used in the far field to get the beam into and out of the amplifier cavity.

In some embodiments, beams are injected in the near field. There are at least two categories of near-field injection:
 1. Angle multiplexing is used in the near field to get the beam into and out of the cavity; and
 2. Polarization multiplexing is used in the near field to get the beam into and out of the cavity. Polarization multiplexing can be implemented in several ways, including:
   a. Use of active polarization switches, in which a Pockels cell is used in combination with a polarizer; and
   b. Use of passive polarization switches, in which a Faraday rotator, an active rotator (such as active quartz rotators), a half-wave plates, or a quarter-wave plate, which may be used alone or combined one with another(s), with one or more polarizers.

There are embodiments in which more than one spatial-filter telescope using eccentric-pupil lenses are used.

There are embodiments in which one or more spatial-filter telescopes using eccentric-pupil lenses are used, in which a spatial-filter telescope that does not use eccentric-pupil lenses is also used. Possible or likely advantages of using some spatial filters without eccentric-pupil lenses are reduced cost and reduced aberrations.

There are embodiments in which one or more spatial-filter telescopes using eccentric-aperture lenses are used, in which one or more spatial filter telescopes using cylindrical lenses and slit spatial filters are also used. Possible or likely advantages of using one or more telescopes with cylindrical lenses and slit filters is the ability to better filter out high-frequency amplitude and phase noise without generating plasmas and ablating spatial filter materials over time, as shots are accumulated. This is especially important for high-energy lasers operated at high repetition rates. Being able to better filter out noise at the slit filters can enable designers to relax spatial filtering requirements for telescopes in the system that use eccentric-pupil lenses. This is a way to mitigate some of the effects of increased aberration due to use of the eccentric pupils, which tend to increase focal-spot size at the pinhole filter plane and make tight spatial filtering in the eccentric-aperture telescopes undesirable (increased ablation at the pinhole, plasma production and "pinhole closure" effects, increased energy loss).

There are embodiments in which various types of absorbing materials, often referred to as baffles, are placed close to but outside the main beam path to absorb light reflected from the surfaces of the eccentric-aperture lenses. These absorbing materials can be placed at various locations along the main beam path. In some instances, especially in high-energy pulsed laser systems in which the reflected light can attain high intensities, it may be necessary to take steps to reduce the intensity of the reflected light to prevent damage to the absorbing materials. Several such steps are as follows:
 1. Using volumetric absorbers, such as glass doped with absorbing ions, which can have higher damage thresholds than surfaces absorbers. Higher damage thresholds are attained by spreading the absorbed energy over more mass, thus reducing the peak temperatures obtained;

2. Orienting the absorbers to achieve oblique angles of incidence, thus spreading the absorbed light over larger surface areas and reducing the peak temperatures obtained;

3. Using reflecting or refracting elements made from high-damage-threshold materials, such as high-purity fused silica, that absorb little or none of the reflected light, to redirect and spread the reflected light so as to reduce intensities before the reflected light is incident on the absorbing material.

4. Successful implantation includes ray-trace modeling of reflected-light ray paths and calculation of ray intensities to identify optimum locations and orientations for absorbing materials, to design the reflecting or refracting elements and to verify that intensities incident on the absorbing materials are below damage thresholds.

There are embodiments in which various types of lens shapes are used, including: biconvex (symmetric and asymmetric), planar-convex (oriented either way), meniscus, aspherical shapes (designed to minimize spherical aberrations, which become more important for eccentric pupils), and achromatic lenses (designed to minimize chromatic aberrations, which become more important for eccentric pupils.

All elements, parts and steps described herein are preferably included. It is to be understood that any of these elements, parts and steps may be replaced by other elements, parts and steps or deleted altogether as will be obvious to those skilled in the art.

Broadly, this writing discloses at least the following: Reduction or elimination of negative consequences of reflected stray light from lens surfaces is achieved by propagating a laser beam through an eccentric pupil that excludes the optical axis of the system, which is rotationally symmetric. In such systems, stray light reflections eventually are focused onto the unique optical axis of the system, in either a real or virtual focal region. By using an eccentric pupil, all damage due to focusing of the stray light lies outside of the beam. These focal regions can, e.g., be physically blocked to eliminate beam paths that lead to optical damage, pre-pulse beams and parasitic lasing.

Concepts:

This writing also presents at least the following concepts:

1. An apparatus, comprising: at least one lens having an optical axis, wherein said at least one lens is rotationally symmetric about said optical axis, wherein a beam of light directed at said at least one lens will produce stray light; and a pupil eccentric to said optical axis, wherein said pupil is configured such that at least a portion of said stray light will be focused or directed by said at least one lens to a location outside of said beam.

2. The apparatus of concepts 1 and 3-21, wherein said pupil is configured such that at least a portion of said stray light will be focused, in a real or a virtual focal region, onto said optical axis outside of said beam.

3. The apparatus of concepts 1, 2, and 4-21 wherein said portion of said stray light comprises all of said stray light.

4. The apparatus of concepts 1-3, further comprising means for blocking or absorbing said stray light.

5. The apparatus of concept 4, wherein said means for absorbing said stray light comprises an absorber.

6. The apparatus of concept 5, wherein said absorber is tilted to reduce fluence from said stray light incident upon said absorber.

7. The apparatus of concept 5, wherein said absorber is cooled.

8. The apparatus of concept 5, further comprising a prism, positioned such that said stray light is first refracted by said prism before it reaches said absorber.

9. The apparatus of concepts 1-3, further comprising means for blocking or absorbing said stray light to eliminate beam paths that lead to negative consequences selected from the group consisting of optical damage, a pre-pulse beams, parasitic lasing, generation of plasma within the path of said beam, generation of parasitic or extraneous laser beams (e.g., "pencil beams"), and back-reflection of light into the source of said beam, wherein said source comprises a laser.

10. The apparatus of concepts 1-5, wherein said at least one lens comprises a plurality of lenses, wherein said plurality of lenses are rotationally symmetric about said optical axis, wherein said beam of light directed at said plurality of lenses will produce said stray light, wherein said pupil is configured such that at least a portion of said stray light will be focused by said plurality of lenses onto said optical axis outside of said beam.

11. The apparatus of concept 10, wherein said plurality of lenses are configured as a Keplerian telescope.

12. The apparatus of concepts 1-5 wherein said at least one lens is a partial lens.

13. The apparatus of concepts 1-5 wherein said stray light propagates in a stray light propagation pathway, wherein said apparatus further comprises a diagnostic positioned in said stray light propagation pathway.

14. The apparatus of concept 13, further comprising a prism, positioned such that said stray light is first refracted by said prism before it reaches said diagnostic.

15. The apparatus of concept 13, further comprising a collimating lens positioned to collimate said stray light to produce collimated stray light, said apparatus further comprising a static corrector plate positioned between said collimating lens and said diagnostic.

16. The apparatus of concepts 1-5, wherein said stray light propagates in a stray light propagation pathway, wherein said apparatus further comprises a source of laser light configured to direct laser light in said pathway back to said at least one lens.

17. The apparatus of concept 16, further comprising a focusing lens positioned to direct said laser light into said pathway, said apparatus further comprising a static corrector plate positioned between said focusing lens and said source of laser light.

18. The apparatus of concept 10, wherein said stray light propagates in a stray light propagation pathway unique to each of said plurality of lenses, wherein said apparatus further comprises a diagnostic positioned in at least one said stray light propagation pathway.

19. The apparatus of concept 10, wherein said stray light propagates in a stray light propagation pathway unique to each of said plurality of lenses, wherein said apparatus further comprises at least one source of laser light configured to direct laser light in at least one said pathway back towards at least one lens of said plurality of lenses.

20. The apparatus of concept 19, further comprising a focusing lens positioned to direct said laser light into at least one said pathway.

21. The apparatus of concept 20, said apparatus further comprising a static corrector plate positioned between said focusing lens and said source of laser light.

22. A method, comprising: providing an apparatus that includes at least one lens having an optical axis, wherein said at least one lens is rotationally symmetric about said optical axis, wherein a beam of light directed at said at least one lens will produce stray light, wherein said apparatus further includes a pupil eccentric to said optical axis, wherein said pupil is configured such that at least a portion of said stray light will be focused or directed to a location outside of said beam; and directing said beam of light through said pupil, wherein and at said lens, wherein stray light is produced by said lens and wherein said stray light is focused or directed by said at least one lens to a location outside of said beam.

23. The method of concepts 22, 24-28 and 31, further comprising blocking or absorbing said stray light.

24. The method of concepts 22, 23-28 and 31, further comprising absorbing said stray light with an absorber that is tilted to reduce fluence from said stray light incident upon said absorber.

25. The method of concepts 22-24, 26-28 and 31, further comprising absorbing said stray with an absorber, further comprising cooling said absorber.

26. The method of concepts 22-25, 27, 28 and 31, further comprising absorbing said stray with an absorber, further comprising positioning a prism such that said stray light is first refracted by said prism before it reaches said absorber.

27. The method of concepts 22-26, 28 and 31, wherein said at least one lens is a partial lens.

28. The method of concepts 22-27 and 31, wherein said stray light propagates in a stray light propagation pathway, the method further comprising operatively positioning a diagnostic in said stray light propagation pathway.

29. The method of concept 28, further comprising positioning a prism such that said stray light is first refracted by said prism before it reaches said diagnostic.

30. The method of concept 28, further comprising operatively positioning a collimating lens to collimate said stray light to produce collimated stray light, the method further comprising operatively positioning a static corrector plate between said collimating lens and said diagnostic.

31. The method of concepts 22-28, wherein said stray light propagates in a stray light propagation pathway, the method further comprising directing laser light in said pathway back to said at least one lens.

32. The method of concept 31, further comprising positioning a focusing lens to direct said laser light into said pathway, further comprising positioning a static corrector plate between said focusing lens and said source of laser light.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. An apparatus, comprising:
    at least one lens having an optical axis, wherein said at least one lens is rotationally symmetric about said optical axis, wherein a beam of light directed at said at least one lens will produce stray light; and
    a pupil eccentric to said optical axis, wherein said pupil is configured such that at least a portion of said stray light will be focused or directed by said at least one lens to a location outside of said beam.

2. The apparatus of claim 1, wherein said pupil is configured such that at least a portion of said stray light will be focused, in a real or a virtual focal region, onto said optical axis outside of said beam.

3. The apparatus of claim 1, wherein said portion of said stray light comprises all of said stray light.

4. The apparatus of claim 1, further comprising means for blocking or absorbing said stray light.

5. The apparatus of claim 4, wherein said means for absorbing said stray light comprises an absorber.

6. The apparatus of claim 5, wherein said absorber is tilted to reduce fluence from said stray light incident upon said absorber.

7. The apparatus of claim 5, wherein said absorber is cooled.

8. The apparatus of claim 5, further comprising a prism, positioned such that said stray light is first refracted by said prism before it reaches said absorber.

9. The apparatus of claim 1, further comprising means for blocking or absorbing said stray light to eliminate beam paths that lead to negative consequences selected from the group consisting of optical damage, a pre-pulse beams, parasitic lasing, generation of plasma within the path of said beam, generation of parasitic or extraneous laser beams (e.g., "pencil beams"), and back-reflection of light into the source of said beam, wherein said source comprises a laser.

10. The apparatus of claim 1, wherein said at least one lens comprises a plurality of lenses, wherein said plurality of lenses are rotationally symmetric about said optical axis, wherein said beam of light directed at said plurality of lenses will produce said stray light, wherein said pupil is configured such that at least a portion of said stray light will be focused by said plurality of lenses onto said optical axis outside of said beam.

11. The apparatus of claim 10, wherein said plurality of lenses are configured as a Keplerian telescope.

12. The apparatus of claim 1, wherein said at least one lens is a partial lens.

13. The apparatus of claim 1, wherein said stray light propagates in a stray light propagation pathway, wherein said apparatus further comprises a diagnostic positioned in said stray light propagation pathway.

14. The apparatus of claim 13, further comprising a prism, positioned such that said stray light is first refracted by said prism before it reaches said diagnostic.

15. The apparatus of claim 13, further comprising a collimating lens positioned to collimate said stray light to produce collimated stray light, said apparatus further comprising a static corrector plate positioned between said collimating lens and said diagnostic.

16. The apparatus of claim 1, wherein said stray light propagates in a stray light propagation pathway, wherein said apparatus further comprises a source of laser light configured to direct laser light in said pathway back to said at least one lens.

17. The apparatus of claim 16, further comprising a focusing lens positioned to direct said laser light into said pathway, said apparatus further comprising a static corrector plate positioned between said focusing lens and said source of laser light.

18. The apparatus of claim 10, wherein said stray light propagates in a stray light propagation pathway unique to each of said plurality of lenses, wherein said apparatus further comprises a diagnostic positioned in at least one said stray light propagation pathway.

19. The apparatus of claim 10, wherein said stray light propagates in a stray light propagation pathway unique to each of said plurality of lenses, wherein said apparatus further comprises at least one source of laser light configured to direct laser light in at least one said pathway back towards at least one lens of said plurality of lenses.

20. The apparatus of claim 19, further comprising a focusing lens positioned to direct said laser light into at least one said pathway.

21. The apparatus of claim 20, said apparatus further comprising a static corrector plate positioned between said focusing lens and said source of laser light.

22. The apparatus of claim 1, wherein said pupil is configured such that when said beam of light is directed parallel to the optical axis through said pupil and to the at least one lens, at least a portion of said stray light will be focused or directed by said at least one lens to a location outside of said beam.

23. The apparatus of claim 1, including a second pupil eccentric to the optical axis, wherein the at least one lens is between the first pupil and the second pupil.

24. A method, comprising:
providing an apparatus that includes at least one lens having an optical axis, wherein said at least one lens is rotationally symmetric about said optical axis, wherein a beam of light directed at said at least one lens will produce stray light, wherein said apparatus further includes a pupil eccentric to said optical axis, wherein said pupil is configured such that at least a portion of said stray light will be focused or directed by said at least one lens to a location outside of said beam; and
directing said beam of light through said pupil and through said lens, wherein stray light is produced by said lens and wherein said stray light is focused or directed by said at least one lens to a location outside of said beam.

25. The method of claim 24, further comprising blocking or absorbing said stray light.

26. The method of claim 24, further comprising absorbing said stray light with an absorber that is tilted to reduce fluence from said stray light incident upon said absorber.

27. The method of claim 24, further comprising absorbing said stray with an absorber, further comprising cooling said absorber.

28. The method of claim 24, further comprising absorbing said stray with an absorber, further comprising positioning a prism such that said stray light is first refracted by said prism before it reaches said absorber.

29. The method of claim 24, wherein said at least one lens is a partial lens.

30. The method of claim 24, wherein said stray light propagates in a stray light propagation pathway, the method further comprising operatively positioning a diagnostic in said stray light propagation pathway.

31. The method of claim 30, further comprising positioning a prism such that said stray light is first refracted by said prism before it reaches said diagnostic.

32. The method of claim 30, further comprising operatively positioning a collimating lens to collimate said stray light to produce collimated stray light, the method further comprising operatively positioning a static corrector plate between said collimating lens and said diagnostic.

33. The method of claim 24, wherein said stray light propagates in a stray light propagation pathway, the method further comprising directing laser light in said pathway back to said at least one lens.

34. The method of claim 33, further comprising positioning a focusing lens to direct said laser light into said pathway, further comprising positioning a static corrector plate between said focusing lens and said source of laser light.

35. The method of claim 24, wherein said beam of light propagates parallel to the optical axis to said lens.

36. The method of claim 24, including directing the beam of light through said pupil, through said lens, and through a second pupil that is eccentric to the optical axis.

* * * * *